United States Patent [19]

Samples et al.

[11] Patent Number: 5,844,054

[45] Date of Patent: Dec. 1, 1998

[54] PROCESS CONTROL IN THE PRESENCE OF CHROMIUM BASED CATALYSTS

[76] Inventors: Paul Kevin Samples, 222 Maplewood Estates, Scott Depot, W. Va. 25560; William Albert Matthews, 109 Bloomingdale Cir., Victoria, Tex. 77904; John Roberts Parrish, 5002 Dempsey Dr., Cross Lanes, W. Va. 25313; Ivan Jeremy Hartley, 116 Riverview Dr., St. Albans, W. Va. 25177; Kiu Hee Lee, 1002 Rustling Rd., South Charleston, W. Va. 25560

[21] Appl. No.: 821,528

[22] Filed: Mar. 21, 1997

[51] Int. Cl.$^6$ .................................................. C08F 2/34
[52] U.S. Cl. ................................ 526/60; 526/82; 526/84; 526/106
[58] Field of Search .................... 526/60, 82, 84, 526/106

[56] References Cited

U.S. PATENT DOCUMENTS

| | | | |
|---|---|---|---|
| 4,540,755 | 9/1985 | Mayhew et al. | 526/100 |
| 5,066,736 | 11/1991 | Dumain et al. | 526/82 |
| 5,244,987 | 9/1993 | Bernard et al. | 526/78 |
| 5,473,027 | 12/1995 | Batchelor et al. | 526/106 |

*Primary Examiner*—Thomas R. Weber

[57] ABSTRACT

A continuous process for the polymerization of one or more alpha-olefins in the gas phase in the presence of a chromium based catalyst, under polymerization conditions including the reaction temperature, the pressure, and the target oxygen to alpha-olefin molar ratio operating point required for desired resin properties.

5 Claims, No Drawings

PROCESS CONTROL IN THE PRESENCE OF CHROMIUM BASED CATALYSTS

TECHNICAL FIELD

This invention relates to the control of olefin polymerization processes in the presence of chromium based catalysts through the manipulation of the catalyst and a resin property modifier.

BACKGROUND INFORMATION

Polyolefins prepared from chromium based catalysts suffer from a deficiency with respect to the simultaneous control of resin properties and production rate when a modifier, such as oxygen, is used to accomplish the task. Oxygen has been used, among other things, to modify flow properties. However, oxygen has been known to reduce catalyst productivity. The polymer industry is constantly seeking to improve resin properties while maintaining or increasing catalyst productivity.

DISCLOSURE OF THE INVENTION

An object of this invention, therefore, is to provide a process for the polymerization of alpha-olefins utilizing chromium based catalysts wherein simultaneous control of resin properties and production rate in the presence of oxygen is provided without the need for additional reactants. Other objects and advantages will become apparent hereinafter.

According to the present invention, such a process has been discovered. The process is a continuous process for the polymerization of one or more alpha-olefins in the gas phase in the presence of a chromium based catalyst, under polymerization conditions including the reaction temperature, the pressure, and the target oxygen to alpha-olefin molar ratio operating point required for desired resin properties, comprising the following steps:

(i) establishing limits on (a) the amount of catalyst and (b) the oxygen to alpha-olefin molar ratio;

(ii) establishing a desired resin production rate in pounds per hour;

(iii) determining the actual production rate as the polymerization progresses;

(iv) determining the amount of catalyst required (a) to bring the actual production rate into line with the desired production rate and (b) to bring the oxygen to alpha-olefin molar ratio to the target oxygen to alpha-olefin molar ratio operating point;

(v) determining the oxygen to alpha-olefin molar ratio required to bring the actual production rate into line with the desired production rate;

(vi) determining the amount of oxygen required for the oxygen to alpha-olefin molar ratio;

(vii) introducing catalyst, alpha-olefin, and oxygen into a reactor in the amounts necessary to satisfy the preceding steps; and (viii) adjusting the target oxygen to alpha-olefin molar ratio operating point as indicated by analysis of the polymer produced for the desired resin properties.

DESCRIPTION OF THE PREFERRED EMBODIMENT(s)

Definitions

1. The oxygen to alpha-olefin molar ratio is defined as the flow of oxygen in moles per hour divided by the flow of primary alpha-olefin in moles per hour. It is calculated by this method because direct measurement of oxygen in the gas mixture is not possible as the oxygen is below detectable levels.

2. The target oxygen to alpha-olefin molar ratio operating point is the ideal desired oxygen to alpha-olefin molar ratio needed to achieve the desired flow properties based on analysis. The target oxygen to alpha-olefin molar ratio operating point defines the direction in which the oxygen to alpha-olefin molar ratio may be manipulated to control flow properties and production rate. As a practical measure, the target point is generally expressed in a narrow range to allow for a slight variation.

The polymer produced can be a homopolymer of an alpha-olefin or a copolymer of two or more alpha-olefins. Optionally, a diene can be included in the copolymer. Useful alpha-olefins generally have 2 to 12 carbon atoms, and preferably have 2 to 8 carbon atoms. Examples of the alpha-olefins are ethylene, propylene, 1-butene, 1-hexene, 4-methyl-1-pentene, and 1-octene. The preferred homopolymers are ethylene and propylene, and the preferred copolymers are those of ethylene and of propylene with one or more other alpha-olefins.

The conventional chromium based catalyst can be selected from those known as Phillips catalysts or from others not classified as such. The early Phillips catalyst was chromium oxide on a silica-alumina support. Examples of chromium based catalysts are described in the following U.S. Pat. Nos. 4,540,755 (supported organophosphorylchromium oxide catalyst; 4,619,980 (silica supported zerovalent chromium compound); 4,668,838 (chromium (III) tris(2-ethylhexanoate); 4,735,931 (Cr/silica-titania catalyst with a triethyl borane cocatalyst); 5,066,736 and 5,244,987 (silica supported chromium oxide); 5,115,068 (a carbon monoxide reduced chromium containing catalyst with a trialkyl borane cocatalyst); 5,137,994 (reaction product of a bis-triarylsilyl chromate and a trihydrocarbylaluminum compound); 5,473,027 ($CrO_3/TiO_2$ catalyst on a silica support); and 4,450,758 and 4,804,714 (chromocene catalysts). Chromium based catalysts also include other fluoride and titanium modified chromium catalysts and silyl chromates.

As noted, the polymerization is carried out in the gas phase. It is preferably effected in a fluidized bed reactor or a stirred-tank reactor. Typical reactors exemplifying these types and the polymerization processes carried out therein can be described as follows:

I. Fluidized bed reactor

The bed is usually made up of the same granular resin that is to be produced in the reactor. Thus, during the course of the polymerization, the bed is comprised of formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, a cycle gas cooler, and a product discharge system. In the vessel, above the bed, there is a velocity reduction zone, and, in the bed, there is a reaction zone. Both are above the gas distribution plate.

A typical fluidized bed reactor is described in U.S. Pat. No. 4,482,687, and a typical fluidized bed polymerization procedure is described in U.S. Pat. No. 4,302,565.

The gaseous feed streams of alpha-olefin(s), oxygen, and hydrogen (optional) are preferably fed to the reactor recycle line as well as liquid alpha-olefins and the cocatalyst solution. Optionally, the liquid cocatalyst can be fed directly to the fluidized bed. The partially activated or completely activated catalyst precursor is preferably injected into the fluidized bed as a solid or a mineral oil slurry. In the case of partial activation, an activator can be added to the reactor. The product composition can be varied by changing the molar ratios of the comonomers introduced into the fluidized bed. The product is continuously discharged in granular or particulate form from the reactor as the bed level builds up with polymerization. The production rate is controlled in part by adjusting the catalyst feed rate.

The hydrogen/alpha-olefin molar ratio can be adjusted to control average molecular weights. In the case of a copolymer of ethylene, the alpha-olefins (other than ethylene) can be present in a total amount of up to 15 percent by weight of the copolymer and, if used, are preferably included in the copolymer in a total amount of about 0. 3 to about 15 percent by weight based on the weight of the copolymer.

The residence time of the mixture of reactants including gaseous and liquid reactants, catalyst, and resin in the fluidized bed can be in the range of about 1 to about 12 hours and is preferably in the range of about 2 to about 5 hours.

The total pressure in the fluidized bed reactor can be in the range of about 100 to about 600 psi (pounds per square inch), and is preferably in the range of about 200 to about 450 psi. Partial pressure of the primary alpha-olefin is set according to the amount of polymer desired. The balance of the total pressure is provided by alpha-olefins other than the primary alpha-olefin and/or inert gases such as nitrogen and inert hydrocarbons. The temperature in the reactors can be in the range of about 10 to about 130 degrees C., and is preferably in the range of about 50 to about 120 degrees C.

The reactor is run in the continuous mode in which granular polymer is typically withdrawn in 600 to 5000 pound shots while the polymerization is in progress. In the continuous mode, the product discharge system is enabled after the bed weight typically builds to 40,000 to 180,000 pounds, and the rate of discharge is altered to maintain constant bed weight.

II. Stirred-tank reactor

The stirred-tank reactor is a two-phase (gas/solid) stirred bed, back mixed reactor. A set of four "plows" mounted horizontally on a central shaft rotate at 200 revolutions per minute (rpm) to keep the particles in the reactor mechanically fluidized. The cylinder swept by these plows measures 40.6 centimeters (16 inches) in length by 39.7 centimeters (15.6 inches) in diameter, resulting in a mechanically fluidizable volume of 46 liters (1.6 cubic feet). The gas volume, which is larger than the mechanically fluidizable volume due to the vertical cylindrical chamber, totals 54.6 liters (1.93 cubic feet). A disengager vessel is mounted atop the vertical cylinder on the reactor. This vessel has a gas volume of 68 liters (2.41 cubic feet), more than doubling the gas volume of the reactor. Gas is continually recirculated through both the reactor and disengager via a blower so that the gas composition is homogeneous throughout.

Reactor pressure used is typically in the range of about 300 to about 450 psig. Monomers and hydrogen (for molecular weight control) are fed to the reactor continuously via control valves. Partial pressures of monomer typically range between about 150 to about 300 psi. Comonomer (if any) content in the polymer is controlled by adjusting feed rates to maintain a constant comonomer/monomer molar ratio in the gas phase. Gas composition is measured at 4 to 6 minute intervals by a gas chromatograph analyzer. Molecular weight of the polymer can be controlled by adjusting hydrogen (optional) feed rate to maintain a constant mole ratio of hydrogen to monomer in the gas phase. Nitrogen makes up the balance of the composition of the gas, entering with the catalyst and leaving via a small vent of the reactor gases. Vent opening is adjusted via computer to maintain constant total pressure in the reactor.

The reactor is cooled by an external jacket of chilled glycol. The bed temperature is measured with an RTD temperature probe in a thermowell protruding into the bed at a 60 degree angle below horizontal, between the inner set of plows. Reactor temperature can be controlled to values in the range of about 10 to about 110 degrees C. Catalyst precursor can be fed either dry or as a slurry. Dry catalyst precursor is metered in shots into a 0.5 to 1 pound per hour nitrogen stream and is fed to the reactor via a ⅛ inch tube. Slurry catalyst precursor is metered in shots into a continuous stream of either isopentane or cocatalyst/isopentane solution in a ⅛ inch tube and this mixture is co-fed to the reactor with a 0.5 to 1 pound per hour nitrogen stream, which keeps polymer from forming in the injection tube. In either case, the catalyst is injected into the bed at an angle of approximately 45 degrees below vertical into the central zone between the front and rear plows.

The reactor is run in the continuous mode in which granular polymer is typically withdrawn in 0.4 pound shots while the polymerization is in progress. In the continuous mode, the product discharge system is enabled after the bed weight typically builds to 15 to 25 pounds, and the rate of discharge is altered to maintain constant bed weight.

A typical run in either reactor commences with monomers being charged to the reactor and feeds adjusted until the desired gas composition is reached. An initial charge of cocatalyst is added prior to starting catalyst feeding in order to scavenge any poisons present in the reactor. After catalyst feed starts, monomers are added to the reactor sufficient to maintain gas concentrations and ratios. Cocatalyst feed rate is maintained in proportion to the catalyst feed rate. A start-up bed may be used to facilitate stirring and dispersal of catalyst during the initial part of the operation. After the desired batch weight is made, the reactor is immediately vented, and monomers are purged from the resin with nitrogen. The batch is then discharged into a box, open to the atmosphere, unless other catalyst deactivation measures are specified. For multi-component operation, e. g., in situ blending, the desired fraction of resin is prepared under the initial reaction conditions, the conditions are changed to the conditions appropriate for the following stage of polymerization, and reaction is continued.

In the process of the invention, a selection of the chromium based catalyst, the alpha-olefin(s), which it is desired to polymerize, and the type of reactor is made as well as process temperature, pressure, and residence time. Then, the above-mentioned steps (i) to (vii) are carried out. This can be accomplished with computerized controls or manual controls. Throughout the process, components and conditions are selected so as not to adversely affect reactor operation, resin properties, or violate the physical limitations of the reactor.

A detailed explanation of the steps follows (i) The limits on the amount of catalyst and oxygen to alpha-olefin molar ratio are selected. In a commercial operation, the catalyst can be fed into the reactor in a range of about 0 to about 250 pounds per hour, and is preferably fed in a range of about 0 to about 100 pounds per hour. This range is adjusted to reflect the productivity of the catalyst and prevent the overfeeding of catalyst to the reactor. The catalyst fed into the reactor can, for short periods of time, be zero to compensate for a much higher than desired production rate. The oxygen to alpha-olefin molar ratio can be limited from about a plus 0.1 to about a minus 0.1 difference from the target oxygen to alpha-olefin molar ratio operating point, and is preferably limited from about a plus 0.01 to about a minus 0.01 difference from the target oxygen to alpha-olefin molar ratio.

(ii) The desired resin production rate in pounds per hour is selected. In a commercial operation, the desired resin production rate can be in the range of about 3000 to about 250,000 pounds per hour, and is preferably in the range of about 8,000 to about 140,000 pounds per hour. This range is typically limited by the size of reactors and would be expected to increase with larger reactors.

(iii) The actual production rate is observed as the polymerization progresses. The can be done by detecting changes in the exotherm of the reaction and calculating a production rate based on these changes.

(iv) The amount of catalyst required (a) to bring the actual production rate into line with the desired production rate and (b) to bring the oxygen to alpha-olefin molar ratio to the predetermined target oxygen to alpha-olefin molar ratio operating point is determined. The amount of catalyst fed to the reactor is the primary control of the production rate. An increase in catalyst feed will increase production rate and conversely a decrease in catalyst feed will decrease production rate.

(v) The oxygen to alpha-olefin molar ratio required to bring the actual production rate into line with the desired production rate is determined. The amount of oxygen to provide the oxygen to alpha-olefin molar ratio is determined. It should be sufficient to have a more timely impact on the production rate. The range of the oxygen to alpha-olefin molar ratio can be about 0 to 1 and is typically in the range of about $10^{-6}$ to about $10^{-2}$. The oxygen to alpha-olefin molar ratio can for short periods of time be zero to compensate for a much lower than desired production rate provided that the target oxygen to alpha-olefin molar ratio and limits selected in the first step allow the oxygen to alpha-olefin molar ratio to be 0. Oxygen has a notable effect on both the production rate and the resin properties. The primary use of oxygen is to modify the flow properties of the resin. The flow properties are typically considered to be melt index, flow index, and melt flow ratio. Typically, oxygen is used to control either the melt index or flow index. The production rate effect is related to the effect of oxygen on flow properties. The oxygen is believed to terminate active catalyst sites thereby stopping the polymerization. This process affects the chain length which influences flow properties, and also reduces the polymerization. Therefore, increasing oxygen in the reactor will decrease the production rate while decreasing oxygen in the reactor will increase the production rate. In addition, a detectable change in production rate due to a change in oxygen is at least an order of magnitude faster than a similar change in the catalyst feed.

Oxygen is not the only contributor to flow properties. Flow properties are also affected by the bed temperature, comonomer addition, and impurities. Temperature has a significant effect on flow properties but is not used to quickly change the flow properties because of its effect on the reaction. The typical polymerization exothermic reaction is unstable in respect to temperature because an increase in temperature increases the reaction. The increased reaction produces more heat in the reactor which continues to increase the reaction. Therefore, manipulating temperature would be contrary to stable operation and reaction. A comonomer is often added to the process to allow control of the density of the resin. It has a smaller effect on flow properties, therefore, it would be counterproductive to control flow properties with the comonomer as density would be adversely affected. Indeed, the effect of comonomer on density is greater than the effect of comonomer on flow properties. Impurities can also affect resin properties, but cannot be measured accurately at the levels that affect the resin. Therefore, impurities are compensated for rather than controlled.

(vi) The amount of oxygen required for the oxygen to alpha-olefin molar ratio is determined. As noted above, the oxygen to alpha-olefin molar ratio is defined as the flow of oxygen in moles per hour divided by the flow of primary alpha-olefin in moles per hour.

(vii) Catalyst, alpha-olefin, and oxygen are introduced into the reactor in the amounts necessary to satisfy the preceding steps.

(viii) The target oxygen to alpha-olefin molar ratio operating point is adjusted as indicated by product analysis to be sufficient to meet the desired resin properties. This target is updated as fast as reasonable and reliable data are available.

It will be understood that the primary alpha-olefin, typically, but not limited to, ethylene or propylene, can be controlled to maintain reactor pressure, and partial pressure. Alpha-olefins, other than the primary, and hydrogen may be controlled to maintain the appropriate concentrations necessary for desired resin properties such as flow properties, density, and bottle weight.

The resin obtained by the above process can, for example, be extruded into film in a conventional extruder adapted for that purpose. Extruders and processes for extrusion are described in U.S. Pat. Nos. 4,814,135; 4,857,600; 5,076,988; and 5,153,382. Examples of various extruders, which can be used in forming the film are a single screw type such as one modified with a blown film die and air ring and continuous take off equipment, a blown film extruder, and a slot cast extruder. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C. Various extrusion features mentioned above can also be found in U.S. Pat. Nos. 4,684,703; 4,293,673; and 4,354,009.

Conventional additives, which can be introduced into the resin, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

The advantages of the invention are as follows: Variation in resin properties and production rate is decreased by the simultaneous manipulation of the catalyst and oxygen feed. Because of the decrease in variation, the likelihood of surges with the concomitant production interruption and degradation of resin properties is reduced and, thus, the production rate can be increased substantially, i.e., up to about 30 percent. Production rate and resin properties can be kept closer to desired values. The decreased variation allows the residence time of the resin to be kept more constant which is a major influence on resin properties for chromium based catalysts. No additional feeds or equipment are necessary to improve control.

Patents mentioned in this specification are incorporated by reference herein.

The invention is illustrated by the following examples.

EXAMPLES 1 THROUGH 5

The process is carried out in a gas phase fluidized bed reactor similar to the one described above. The chromium based catalyst used in the process can be further described as a silica supported chromium oxide (Phillips type) that has been flourinated and titanated. Variables are controlled through predictive computer models and coordinated control methods.

The reactor is operated continuously within the following ranges:

Total pressure: 298 to 312 psig
Temperature: 88.5 to 90.5 degrees C.

The alpha-olefins are ethylene and 1-butene. The gas composition, by weight, is 79 to 83.6 percent ethylene; 5.6 to 6.25 percent 1-butene; less than 0.025 percent hydrogen; balance: nitrogen, ethane, methane, hexane. The desired flow property in this example is melt index.

Example 1 steps (i) The oxygen limit is selected to be at minus 0.01 to a plus 0.01 oxygen to alpha-olefin molar ratio relative to the target oxygen to alpha-olefin molar ratio. The target oxygen to alpha-olefin molar ratio operating point is varied between 0.04 to 0.09. The catalyst limit is set from a low of 0 to a high of 10 pounds per hour.

(ii) Initially, a desired resin production rate of 26,300 pounds per hour is selected. The desired production rate is varied in a range from about 24,500 to about 28,000 pounds per hour throughout the operating period as process conditions allow different production rates.

(iii) The production rate is continuously measured. A difference between the actual and desired production rates is determined.

(iv) From the difference between the actual and desired production rate the amount of catalyst fed to the reactor is varied from 3 to 5 pounds per hour over the entire operating period. When production rate falls below the rate desired, the catalyst feed is increased, and when production rate rises above the rate desired, the catalyst feed is decreased. All comparisons are based on predictive calculations. The catalyst feed is maintained within the 0 to 10 pound per hour limit established earlier. However, it is varied to allow the oxygen to alpha-olefin molar ratio to return to its predetermined target oxygen to alpha-olefin molar ratio operating point. In this example, the oxygen varies, for periods of time, from the target value, but when catalyst feed begins to have an effect on production rate, the oxygen to alpha-olefin molar ratio is moved back closer to the target. It does not always return exactly to the target oxygen to alpha-olefin molar ratio because of changing process conditions such as poisons or catalyst differences, but the trend to return to target is present.

(v) Over the operating period the oxygen to alpha-olefin molar ratio is on average approximately 0.0049 greater than the approximate average target oxygen to alpha-olefin molar ratio. This is well within the limited range of minus 0.01 to plus 0.01 around the target oxygen to alpha-olefin molar ratio which indicates the oxygen to alpha-olefin molar ratio is kept near its target value for desired flow properties. If the oxygen to alpha-olefin molar ratio was the sole control variable for production rate, variation of the oxygen to alpha-olefin molar ratio would be expected to be much higher. Some of the offset of the actual oxygen to alpha-olefin molar ratio compared to the target oxygen to alpha-olefin molar ratio is also traced to changing poison levels from the reactor feed streams and the accuracy of predicted catalyst feed effect on production rate compared to its actual effect on production rate. From the difference between the actual and desired production rate and considering the effect of catalyst, the oxygen to alpha-olefin molar ratio is, as noted, varied from minus 0.01 to plus 0.01 relative to the target oxygen to alpha-olefin molar ratio pounds per hour over the entire operating period. Based on production predictive calculations, the oxygen to alpha-olefin molar ratio is increased when the production rate is above that desired, and the oxygen to alpha-olefin molar ratio is decreased when the production rate is below that desired. The oxygen to alpha-olefin molar ratio is maintained within the minus 0.01 to plus 0.01 limit relative to the target oxygen to alpha-olefin molar ratio established in the first step.

(vi) The amount of oxygen needed to maintain the oxygen alpha-olefin ratio is determined. The oxygen is delivered in a mixture of 92.5 percent nitrogen and 7.5 percent oxygen. The needed amount of nitrogen and oxygen mixture required is calculated to be in a range between 0.0015 to 0.034 pounds per hour.

(vii) The catalyst feed, primary alpha-olefin(ethylene), and oxygen is introduced (and controlled) into the reactor at flows between 19,500 and 24,750 pounds per hour to keep the reactor pressure and ethylene partial pressure near desired values and to satisfy the previous steps. The oxygen and nitrogen mixture is introduced (and controlled) in a range between 0.0015 to 0.034 pound per hour into the reactor to satisfy the previous steps. The catalyst feed is mentioned above.

(viii) The target oxygen to alpha-olefin molar ratio operating point is adjusted as indicated by product analysis. In this case, laboratory and empirical models are used to recommend operating points, and manual adjustments are made to the target oxygen to alpha-olefin molar ratio operating point. When the measured or predicted flow property is higher than desired, the target oxygen to alpha-olefin molar ratio is lowered. When the measured or predicted flow property is lower than desired, the target oxygen to alpha-olefin molar ratio is raised. As also noted in the first step, the target oxygen to alpha-olefin molar ratio operating point is varied from about 0.04 to about 0.09.

After a reaction operation time of 7.1 days, it is found that the melt index, density, and production rate variation improve (narrowed) over the entire operation time. Variation is recorded as the standard deviation over the operating period

| Example 1 variation | |
|---|---|
| Property | final variation |
| melt index | 0.05150 gram per 10 minutes |
| density | 0.0004704 gram per cubic centimeter |
| production rate | 581.6 pounds per hour |

In examples 2 through 5, the reaction operation period varies from about 5 days to 8.25 days. The process is the same as in example 1 except that the variables are controlled by typical manual methods. These manual methods include manipulation of catalyst feed as primary regulation of production rate control and manipulation of oxygen to alpha-olefin molar ratio as primary regulation of melt (or flow) index control. A summary of examples 2 to 5 is provided for comparison.

| Example 2 variation (comparative example) | |
|---|---|
| Property | final variation |
| melt index | 0.07346 gram per 10 minutes |
| density | 0.001004 gram per cubic centimeter |
| production rate | 4224.3 pounds per hour |

| Example 3 variation (comparative example) | |
|---|---|
| Property | final variation |
| melt index | 0.05911 gram per 10 minutes |
| density | 0.0007112 gram per cubic centimeter |
| production rate | 1189.1 pounds per hour |

| Example 4 variation (comparative example) | |
|---|---|
| Property | final variation |
| melt index | 0.06366 gram per 10 minutes |
| density | 0.0005481 gram per cubic centimeter |
| production rate | 1231.8 pounds per hour |

| Example 5 variation (comparative example) | |
|---|---|
| Property | final variation |
| melt index | 0.07381 gram per 10 minutes |
| density | 0.0004153 gram per cubic centimeter |
| production rate | 2227.7 pounds per hour |

| Comparison of Results | | |
|---|---|---|
| Property | average variation (comparative examples) | variation embodiment of invention |
| melt index | 0.06759 g/10 min | 0.05150 g/10 min |
| density | 0.0006696 g/cc | 0.0004704 g/cc |
| production rate | 2218.2 lbs/hr | 581.6 lbs/hr |

Notes: 1. Melt Index (g/10 min) is determined under ASTM D-1238, Condition E. It is measured at 190 degrees C. and reported as grams per 10 minutes.
2. Flow Index is determined under ASTM D-1238, Condition F. It is measured at 10 times the weight used in the melt index test above. Flow index variation: flow index of sieved fractions from the largest (greater than 10 mesh) to the smallest (less than 140 mesh).

We claim:

1. A continuous process for the polymerization of one or more alpha-olefins in the gas phase in the presence of a chromium based catalyst, under polymerization conditions including the reaction temperature, the pressure, and the target oxygen to alpha-olefin molar ratio operating point required for desired resin properties, comprising the following steps:

(i) establishing limits on (a) the amount of catalyst and (b) the oxygen to alpha-olefin molar ratio;

(ii) establishing a desired resin production rate in pounds per hour;

(iii) determining the actual production rate as the polymerization progresses;

(iv) determining the amount of catalyst required (a) to bring the actual production rate into line with the desired production rate and (b) to bring the oxygen to alpha-olefin molar ratio to the target oxygen to alpha-olefin molar ratio operating point;

(v) determining the oxygen to alpha-olefin molar ratio required to bring the actual production rate into line with the desired production rate;

(vi) determining the amount of oxygen required for the oxygen to alpha-olefin molar ratio;

(vii) introducing catalyst, alpha-olefin, and oxygen into a reactor in the amounts necessary to satisfy the preceding steps; and (viii) adjusting the target oxygen to alpha-olefin molar ratio operating point as indicated by analysis of the polymer produced for the desired resin properties.

2. The process defined in claim 1 wherein (i) the temperature is in the range of about 10 to about 130 degrees C.;

(ii) the pressure is in the range of about 100 to about 600 psi;

(iii) the oxygen to alpha-olefin molar ratio is in the range of about 0 to about 1.

3. The process defined in claim 1 wherein (i) the temperature is in the range of about 50 to about 110 degrees C.;

(ii) the pressure is in the range of about 200 to about 450 psi;

(iii) the oxygen to alpha-olefin molar ratio is in the range of about $10^{-6}$ to about $10^{-2}$.

4. The process defined in claim 1 where the catalyst is a chromocene catalyst.

5. The process defined in claim 1 wherein the reactor is a fluidized bed.

* * * * *